United States Patent
Fornage et al.

(10) Patent No.: US 9,509,371 B2
(45) Date of Patent: Nov. 29, 2016

(54) METHOD AND APPARATUS FOR POWER LINE COMMUNICATIONS DISTORTION COMPENSATION

(71) Applicant: Enphase Energy, Inc., Petaluma, CA (US)

(72) Inventors: Martin Fornage, Petaluma, CA (US); Kennan Laudel, San Jose, CA (US)

(73) Assignee: Enphase Energy, Inc., Petaluma, CA (US)

( * ) Notice: Subject to any disclaimer, the term of this patent is extended or adjusted under 35 U.S.C. 154(b) by 31 days.

(21) Appl. No.: 14/490,833

(22) Filed: Sep. 19, 2014

(65) Prior Publication Data

US 2015/0078463 A1    Mar. 19, 2015

Related U.S. Application Data

(60) Provisional application No. 61/879,892, filed on Sep. 19, 2013.

(51) Int. Cl.
| | |
|---|---|
| *H04B 3/00* | (2006.01) |
| *H04L 25/00* | (2006.01) |
| *H04B 3/54* | (2006.01) |
| *H04B 15/00* | (2006.01) |

(52) U.S. Cl.
CPC .............. *H04B 3/54* (2013.01); *H04B 3/542* (2013.01); *H04B 15/00* (2013.01); *H04B 2203/5425* (2013.01)

(58) Field of Classification Search
USPC .................................................. 375/257, 297
See application file for complete search history.

(56) References Cited

U.S. PATENT DOCUMENTS

| | | | |
|---|---|---|---|
| 8,064,851 B2 | 11/2011 | Mccallister | |
| 8,294,516 B2 | 10/2012 | Young et al. | |
| 8,653,689 B2 | 2/2014 | Rozenboim | |
| 2007/0041229 A1 | 2/2007 | Cheng | |
| 2007/0188243 A1* | 8/2007 | Waheed et al. | 331/16 |
| 2010/0027600 A1* | 2/2010 | Schwager et al. | 375/222 |
| 2011/0148202 A1* | 6/2011 | Rada et al. | 307/52 |

(Continued)

FOREIGN PATENT DOCUMENTS

| | | |
|---|---|---|
| EP | 1568192 B1 | 4/2009 |
| KR | 20110121805 A | 11/2011 |

OTHER PUBLICATIONS

McClellan et al., "Coherent Pre-Distortion of Low-Frequency PLC Carriers", CTRQ 2013 : The Sixth International Conference on Communication Theory, Reliability, and Quality of Service, pp. 29-34, 2013.

(Continued)

*Primary Examiner* — Tanmay Shah
(74) *Attorney, Agent, or Firm* — Moser Taboada (57) ABSTRACT

A method and apparatus for harmonic distortion compensation in power line communications. In one embodiment, the method comprises analyzing a waveform generated by a transmitter of a power line communications transceiver (PLCT), wherein the waveform is analyzed to determine harmonic information for one or more harmonics of a carrier waveform of the PLCT; computing, based on the harmonic information, one or more harmonic compensation coefficients; and pre-distorting, based on the one or more harmonic compensation coefficients, the carrier waveform such that the one or more harmonics are reduced below a threshold.

20 Claims, 7 Drawing Sheets

(56) References Cited

U.S. PATENT DOCUMENTS

2011/0292699 A1    12/2011   Goerke et al.
2013/0163644 A1     6/2013   Haug et al.
2013/0201316 A1*    8/2013   Binder et al. .................. 348/77

OTHER PUBLICATIONS

PCT Search Report and Written Opinion, PCT/US2014/056484, 11 pages, Date of mailing Dec. 18, 2014.

\* cited by examiner

FIG. 7

METHOD AND APPARATUS FOR POWER LINE COMMUNICATIONS DISTORTION COMPENSATION

CROSS-REFERENCE TO RELATED APPLICATION

This application claims priority to U.S. Provisional Patent Application No. 61/879,892 filed on Sep. 19, 2013, which is herein incorporated in its entirety by reference.

BACKGROUND OF THE INVENTION

1. Field of the Invention

Embodiments of the present disclosure relate generally to harmonic distortion compensation and, more particularly, to pre-distorting a power line communication (PLC) waveform to compensate for undesirable harmonics in the generated PLC waveform.

2. Description of the Related Art

Power Line Communications (PLC) is a technology for utilizing power lines, such as the existing commercial AC power grid infrastructure, to communicate data between devices coupled to the power lines. Relevant regulatory requirements for PLC signal distortion are difficult to pass, and often the output power has to be limited to pass the relevant specifications.

Therefore, there is a need in the art for a method and apparatus for efficient PLC signal distortion compensation.

SUMMARY OF THE INVENTION

Embodiments of the present invention generally relate to an apparatus and system for harmonic distortion compensation substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
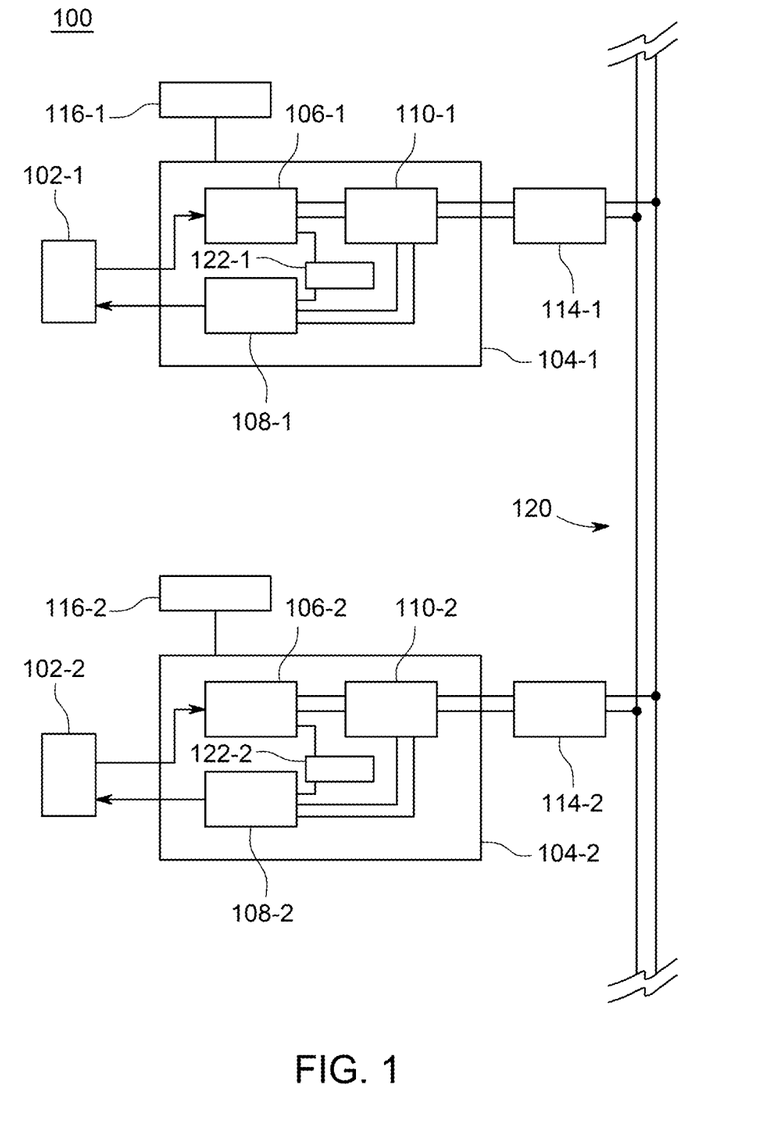
FIG. 1 is a functional block diagram of a system for harmonic distortion compensation for power line communications in accordance with one or more embodiments of the present invention.

FIG. 1 is a functional block diagram of a system 100 for harmonic distortion compensation for power line communications in accordance with one or more embodiments of the present invention. The system 100 comprises a device 102-1 coupled to a power line communications transceiver (PLCT) 104-1, which is further coupled to an AC power line 120 ("power line 120") via a junction box 114-1. Additionally, the system 100 comprises a device 102-2 coupled to a PLCT 104-2, which is further coupled to the power line 120 via a junction box 114-2. The devices 102-1 and 102-2, collectively referred to as devices 102, are devices requiring communications bandwidth for transmitting and/or receiving data, such as a home computer, peripheral device, power converters, and the like, and are capable of communicating with one another over the power line 120 via the PLCTs 104-1 and 104-2, respectively. In some embodiments, the PLCT 104-1 and/or the PLCT 104-2 may be coupled directly to the power line 120 without the use of junction boxes 114-1/114-2. One particular embodiment that uses the inventive system is described below with respect to FIG. 5.

The PLCT 104-1 comprises a transmitter 106-1 and a receiver 108-1, each coupled to the device 102-1, and a coupler 110-1 that couples both the transmitter 106-1 and the receiver 108-1 to the junction box 114-1. When the PLCT 104-1 is operating in a "transmit mode", the transmitter 106-1 is capable of transmitting data to the device 102-2 via the power line 120.

The receiver 108-1 is capable of receiving data from the device 102-2 via the power line 120. The PLCT 104-1 may be able to simultaneously receive and transmit data; however, the transmitter 106-1 may generally blind the receiver 108-1 while active. In some embodiments, a PLCT controller 116-1 is coupled to the PLCT 104-1 and provides various control for the PLCT 104-1. The PLCT controller 116 may be separate from the PLCT 104-1 as depicted in FIG. 1, or, alternatively, the PLCT controller 116-1 may be a component of the PLCT 104-1.

The PLCT 104-1 further comprises a distortion compensation controller 122-1 ("controller 122-1") coupled to the transmitter 106-1 and the receiver 108-1. In accordance with one or more embodiments of the present invention, the controller 122-1 provides harmonic compensation to pre-distort the PLCT carrier wave in order to compensate for harmonic distortion generated, for example, by non-ideal circuit behavior within the transmitter 106-1, as described in detail below.

Analogous to the PLCT 104-1, the PLCT 104-2 comprises a transmitter 106-2, a receiver 108-2, and a coupler 110-2. The transmitter 106-2 and receiver 108-2 are coupled to the device 102-2 as well as the coupler 110-2, and the coupler 110-2 is further coupled to the junction box 114-2. The PLCT 104-2 further comprises a distortion compensation controller 122-2 ("controller 122-2") coupled to the transmitter 106-2 and the receiver 108-2, for providing harmonic compensation to pre-distort the PLCT carrier wave to compensate for harmonic distortion.

In some embodiments, a PLCT controller 116-2 is coupled to the PLCT 104-2 and provides various control for the PLCT 104-2. The PLCT controller 116-2 may be separate from the PLCT 104-2 as depicted in FIG. 1, or, alternatively, the PLCT controller 116-2 may be a component of the PLCT 104-2. The PLCT 104-2 transmits and receives analogous to the PLCT 104-1.

In some alternative embodiments, a receiver 108 may not be present within a PLCT 104 and the PLCT 104 is only used for transmitting information via the power line 120.

Figure 2:
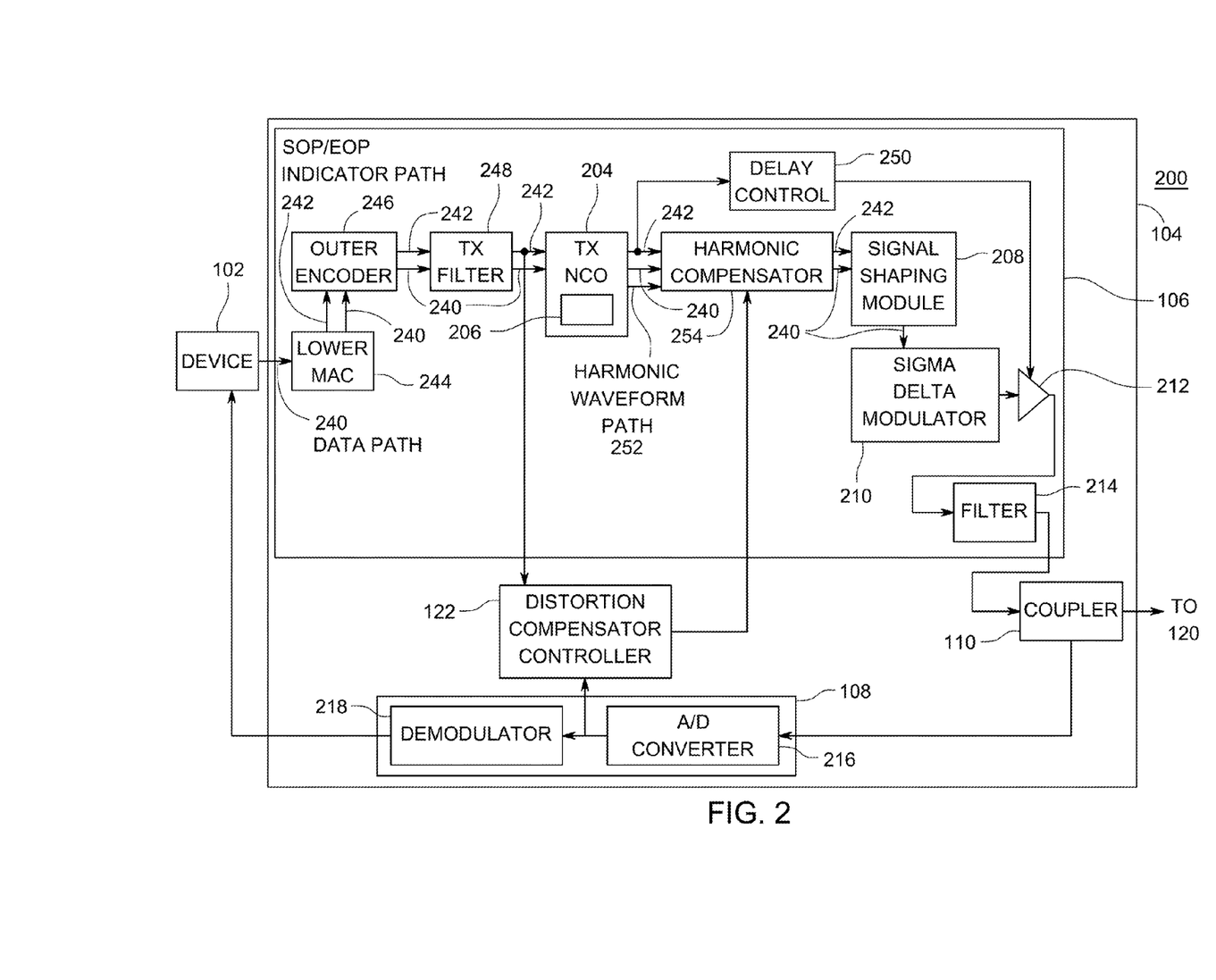
FIG. 2 is a functional block diagram of a transmitter in accordance with one or more embodiments of the present invention.

FIG. 2 is a functional block diagram of a PLCT 104 in accordance with one or more embodiments of the present invention. The PLCT transmitter 106 comprises a series combination of a lower media access control (MAC) module 244 ("MAC module 244"), an outer encoder 246 ("encoder 246"), a transmission filter 248 ("filter 248"), a numerically controlled oscillator (NCO) 204, a harmonic compensator 254, a signal shaping module 208, a sigma-delta (ΣΔ) modulator 210, an amplifier 212 and a low-pass filter 214 ("filter 204"). The transmitter 106 further comprises a delay/control module 250 coupled between an output from the NCO 204 and the amplifier 212. The controller 122 is coupled to the NCO 204 and to an output from the filter 248.

The MAC module 244 is coupled to the device 102 for receiving a digital input data signal comprised of data packets for transmission over the power line 120. The MAC module 244 receives the input data signal from the device 102 via a data path 240 that further extends through the serially-coupled components of the transmitter 106 (i.e., the data to be transmitted over the power line 120 traverses the transmitter 106 via the data path 240). The output of the MAC module 244 is coupled to the encoder module 246 by both the data path 240 and a start of packet/end of packet (SOP/EOP) indicator path 242. The MAC module 244 couples the data signal to the encoder 246 via the data path 240; additionally, the MAC module 244 couples an SOP/EOP indication to the encoder 246 via the SOP/EOP path 242 for marking the start and end of packet processing. In some embodiments, the SOP/EOP indication may be a logic control bit that goes high when first data valid is received and then goes low after last data valid received.

The encoder 246 adds forward error correction redundancy to the signal to improve robustness in reception. For example, Reed Solomon codes, Trellis codes, Turbo codes, low-density parity-check (LDPC) codes, or the like, may be used. The encoder 246 couples the encoded signal, via the data path 240, to the NCO 204 through the filter 248. Any SOP/EOP indications are coupled from the encoder 246 to both the NCO 204 and the controller 122 via the SOP/EOP path 242 through the filter 248.

The NCO 204 can be controlled in phase, frequency, amplitude, or combinations thereof. In accordance with the received signals from the filter 248 when data is being transmitted, the NCO 204 uses a sine look-up table 206 ("sine table 206") to generate a synchronous (i.e., clocked), discrete-valued representation of a waveform and couples such digital waveform to the harmonic compensator 254 via the data path 240. The digital waveform generated by the NCO 204 when data is being transmitted is a digital modulated signal (i.e., a digital representation of a modulated signal). In some embodiments, the digital modulated signal may be on the order of 8-16 bits wide at a sample rate of 25 Megasamples per second (MSPS); alternatively, the digital modulated signal may comprise fewer or more bits and/or may be at a different sample rate. In certain embodiments, frequency-shift keying (FSK) modulation may be employed and digital frequency control signals are generated based on received input. In some alternative embodiments, other modulation techniques may be utilized, for example minimum-shift keying (MSK), M-ary quadrature amplitude modulation (QAM), quadrature phase-shift keying (QPSK), phase-shift keying (PSK), orthogonal frequency-division multiplexing (OFDM), pulse-amplitude modulation (PAM), or the like, where the transmitter 106 may comprise additional and/or alternative components as needed to support such modulation techniques. When no data is being transmitted from the device 102, the NCO 204 is disabled and no signal is emitted.

The output from the NCO 204 is coupled to the harmonic compensator 254 via the data path 240 and the SOP/EOP path 242 for providing the digital modulated signal and the SOP/EOP indications, respectively, to the harmonic compensator 254. Additionally, the NCO 204 is coupled to the harmonic compensator 254 via a harmonic waveform path 252 for providing one or more harmonic waveforms to the harmonic compensator 254 as described below. The harmonic compensator 254 is coupled to the controller 122.

The delay/control module 250 is coupled to the SOP/EOP path 242 at the output of the NCO 204 for receiving the SOP/EOP indications. The SOP/EOP indication is coupled to the delay/control module 250 for delay in accordance with the delays of the packet/data processing; additionally or alternatively, the packet processing can extend it as well, for example, after preamble is pre-pended to the packet. The delay/control module 250 couples a "transmit enable" signal, based on the SOP/EOP indication, to the amplifier 212 for enabling the transmit mode of the PLCT 104.

The output from the harmonic compensator 254 is coupled to the signal shaping module 208 via both the SOP/EOP indicator path 242 and the data path 240. The signal shaping module 208 uses the SOP/EOP indication to determine the start and end of transmission data and correspondingly shapes the digital waveform from the NCO 204. In some embodiments, the signal shaping module 208 shapes the received digital waveform based on a gate control signal that comprises a "ramp up" (or "attack") period, a "transmit" period, and a "ramp down" (or "decay") period associated with the beginning, duration, and end, respectively, of a data packet.

The gate control signal attack period begins prior to the start of the data packet and ends at the start of the data packet. During the attack period, the gate control signal ramps up from a value of 0 and reaches a value of, for example, 1 at the start of the data packet. During the attack period, the NCO 204 generates an unmodulated digital carrier wave (i.e., a digital representation of a sinusoidal carrier wave).

The transmit period then begins at the start of the data packet and continues to the end of the data packet. For the duration of the data packet (i.e., during the gate control signal transmit period), the NCO generates the digital modulated signal and the gate control signal remains at, for example, the value of 1. At the end of the data packet, the gate control signal decay period begins and the gate control signal falls from the value of 1 to reach a value of 0 at the end of the decay period. During the decay period, the NCO 204 generates the unmodulated digital carrier wave. The attack and decay periods may each be on the order of a few hundred microseconds and may have a general shape of ramps, raised cosine, or other suitable waveforms. The creation of the attack/decay can be done with a multiply function that is controlled from a scaling look-up table that contains the attack/decay profile.

The gate control signal modulates the amplitude of the digital waveform from the NCO 204 in a controlled (i.e., non-binary) manner to avoid spectrum "splattering". The resulting output signal from the signal shaping module 208 is coupled, via the data path 240, to the ΣΔ modulator 210 and converted to an analog signal. The analog output from the ΣΔ modulator 210 is coupled to the amplifier 212. The output from the amplifier 212 is coupled through the filter 214 and the coupler 110 to the power line 120.

The PLCT receiver 108 is coupled to the output of the filter 214 via the coupler 110 such that the receiver 108 can receive the analog signal generated by the transmitter 106 of the same PLCT 104 for determining harmonic compensation as described further below. Additionally, when another PLCT 104 is transmitting on the power line 120, the receiver 108 receives the corresponding analog voltage waveform from the power line 120 through the coupler 110. An analog-to-digital (A/D) converter 216 of the receiver 108 converts the received analog signal to a digital signal and couples the digital signal to a demodulator 218; the resulting demodulated digital data signal is then coupled to the device 102.

In accordance with one or more embodiments of the present invention, the unmodulated wave signal (i.e., the carrier waveform) that is generated by the PLCT 104 during the gate control signal attack and decay periods is analyzed to identify one or more harmonics for providing harmonic compensation. In some embodiments, the output from the A/D converter 216 is coupled to the controller 122 (as depicted in FIG. 2) and the controller 122 performs a Discrete Fourier Transform (DFT) (or, alternatively, a Fast Fourier Transform (FFT) or a coordinate rotation digital computer (CORDIC) algorithm) to measure the magnitude and phase information of a plurality of harmonics, such as harmonics 2, 3, 4 and 5.

Based on the determined harmonic information (i.e., the magnitude and phase for each harmonic), the controller 122 computes one or more compensation coefficients and couples the compensation coefficients to the harmonic compensator 254. The NCO 204 is multiplexed to generate a digital carrier waveform at a fundamental frequency (for example, 103 kHz or 123 kHz) as well as one or more digital waveforms each at a different harmonic. The digital waveforms are each modulated and coupled to the harmonic compensator 254 (i.e., the modulated carrier waveform is coupled to the harmonic compensator 254 via the data path 240, and the modulated harmonic waveforms are coupled to the harmonic compensator 254 via the harmonic waveform path 252). The harmonic compensator 254 multiplies each of the modulated digital waveforms by the corresponding compensation coefficient using a complex multiplier (amplitude and phase) for each modulated harmonic. Following the multiplication, the corrected fundamental waveform and the corrected harmonic waveform(s) are then summed within the harmonic compensator 254 and the resulting output is coupled to the signal shaping module 208 via the data path 240. In general, the modulated fundamental waveform is multiplied by a compensation coefficient or linear combination of multiple compensation coefficients prior to summing the waveforms.

The harmonic compensator 254, one embodiment of which is described below with respect to FIG. 7, uses the compensation coefficients to adjust or filter the NCO-generated harmonics from the NCO 204 such that the adjusted harmonics, when summed with the unintentional harmonics (from analog front end imperfections, for example) reduces the net harmonic content power on the power line 120 significantly towards zero (i.e., the harmonics are eliminated or substantially reduced to be below a threshold). For example, carrier waveform harmonics at frequencies greater than 500 kHz prior to the compensation may be reduced below a threshold level of 56 dB(μV) in the compensated waveform. Generally, harmonics may be sufficiently reduced or eliminated to comply with relevant regulatory standards for PLC distortion limits, such as distortion limits specified in EN50065-2-1 and EN50065-2-2. The compensation coefficients may then be stored and updated during future packet transmission. In one or more embodiments, the detected harmonics may be averaged for determining the compensation coefficients.

In some alternative embodiments, rather than coupling the output from the A/D converter 216 to the controller 122 for determining the harmonic information, the output from the demodulator 218 is coupled to the controller 122. In such embodiments, the receiver 108 is tuned to a harmonic of interest and the controller 122 determines the harmonic amplitude and phase information and the corresponding harmonic distortion compensation, for example by using a simple coordinate rotation digital computer (CORDIC) algorithm. In one or more of such embodiments, the receiver 108 may be automatically tuned to different harmonics for periods of time to determine the distortion compensation for the various harmonics of interest (e.g., the controller 122 may be coupled to the receiver 108 for automatically tuning the receiver 108).

In some other alternative embodiments, one or more harmonics are identified when the MAC module 244 enters a "maintenance cycle" (where all other modems are to be quiet) during which a single tone (constant amplitude) is generated by the NCO 204 and resulting harmonic content is analyzed. Alternatively, multiple tones may be generated and analyzed.

In one or more other alternative embodiments where the harmonic compensator 254 is not present, the sine table 206 is updated based on the harmonic compensation coefficients to pre-distort the carrier waveform such that the harmonics are eliminated or substantially reduced to be below a threshold.

Figure 3:
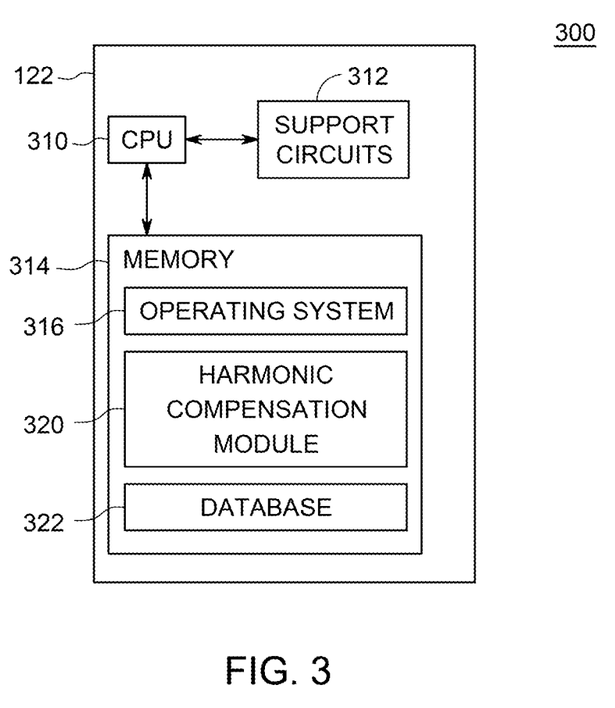
FIG. 3 is a functional block diagram of a controller in accordance with one or more embodiments of the present invention.

FIG. 3 is a functional block diagram of a controller 122 in accordance with one or more embodiments of the present invention. The controller 122 may be comprised of hardware, software, or a combination thereof, and may in certain embodiments comprise a central processing unit (CPU) 310 coupled to support circuits 312 and memory 314. The CPU 310 may comprise one or more conventionally available microprocessors, microcontrollers and the like, which are capable of performing the processing described herein; in some embodiments, the CPU 310 may be a microcontroller comprising internal memory for storing controller firmware that, when executed, provides the functionality described below with respect to FIG. 4. Alternatively, the CPU 310 may include one or more application specific integrated circuits (ASICs). The support circuits 312 are well known circuits used to promote functionality of the CPU 310. Such circuits include, but are not limited to, a cache, power supplies, clock circuits, buses, network cards, input/output (I/O) circuits, and the like. The controller 122 may be implemented using a general purpose computer that, when executing particular software, becomes a specific purpose computer for performing various embodiments of the present invention.

The memory 314 may comprise random access memory, read only memory, removable disk memory, flash memory, and various combinations of these types of memory. The memory 314 is sometimes referred to as main memory and may, in part, be used as cache memory or buffer memory. The memory 314 generally stores the operating system (OS) 316 of the controller 122. The OS 316 may be one of a number of commercially available OSs such as, but not limited to, Linux, Real-Time Operating System (RTOS), and the like.

The memory 314 may store various forms of application software, such as a harmonic compensation module 320 and a database 322.

During the gate control signal attack and decay periods, the harmonic compensation module 320 analyzes the unmodulated carrier signal to identify one or more harmonic components. In some embodiments, a Discrete Fourier Transform (DFT) (or Fast Fourier Transform, FFT) is used to measure the magnitude and phase information of at least one harmonic; in other embodiments, the receiver 108 can be tuned to a harmonic of interest and a simple CORDIC algorithm can be used to determine phase correction necessary. In one or more embodiments, the amplitude and phase information for the $2^{nd}$, $3^{rd}$, $4^{th}$ and $5^{th}$ order harmonics are determined; in other embodiments, the amplitude and phase information may be determined for additional and/or alternative harmonics.

Based on the determined harmonics, the harmonic compensation module 320 computes one or more compensation coefficients and couples the computed compensation coefficients to the harmonic compensator, 254 which adjusts or filters the NCO-generated harmonics from the NCO 204 as previously described to eliminate or substantially reduce the determined harmonics to be below a threshold.

In some alternative embodiments, the compensation coefficients are used to update the sine table 206 such that the carrier wave generated by the NCO 204 is pre-distorted to eliminate or substantially reduce the harmonics to be below a threshold. In some other alternative embodiments, correction external to the sine table 206 may be made in order to pre-distort the carrier wave (e.g., one or more complex multipliers downstream from the sine table 206 (amplitude and phase) may be used for compensation of a separate parallel sine table for the harmonic, and the fundamental and (corrected) harmonics are then summed). The compensation coefficients may then be stored, e.g. within the database 322, and updated during future packet transmission. Generally, the carrier wave is modified over multiple measurements to converge to a pre-distorted waveform that eliminates or substantially reduces the detected harmonics to be below a threshold. In one or more embodiments, the detected harmonics may be averaged for determining the compensation coefficients. Functionality provided by the harmonic compensation module 320 in one embodiment is described below with respect to FIG. 4.

The memory 314 further stores the database 322 for storing data, such as data related to the present invention. Such data may include compensation coefficients determined by the harmonic compensation module 320 and/or one or more look-up tables, such as a scaling look-up table that contains an attack/decay profile for use by the gate control signal shaping module 208.

Figure 4:
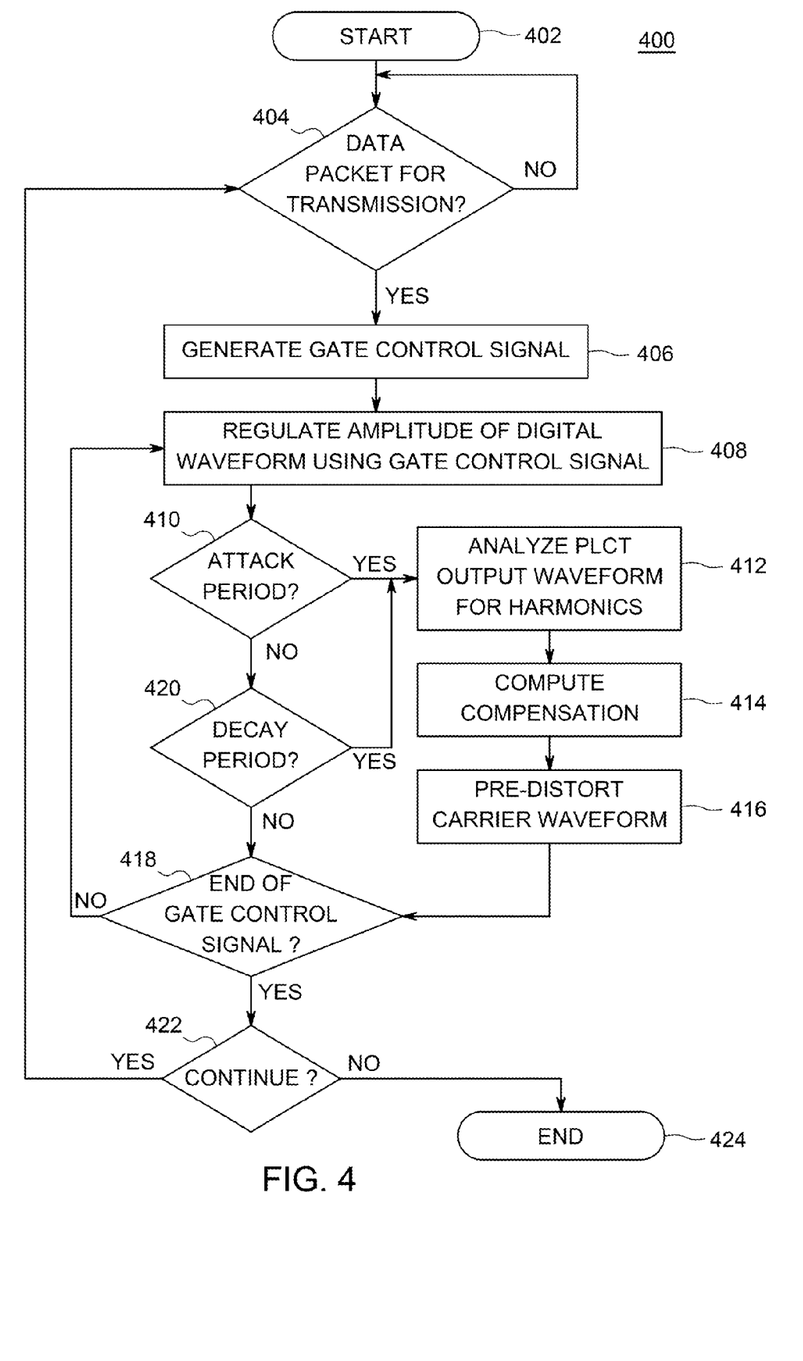
FIG. 4 is a flow diagram of a method for harmonic distortion compensation in accordance with one or more embodiments of the present invention.

FIG. 4 is a flow diagram of a method 400 for harmonic distortion compensation in accordance with one or more embodiments of the present invention. The method 400 is an implementation of the harmonic compensation module 320.

Generally, a device is coupled to a power line communications transceiver (PLCT) for communicating data packets via a power line (e.g., the device 102 coupled to the PLCT 104). The PLCT may transmit the data using modulation techniques such as digital frequency-shift keying (FSK), M-ary quadrature amplitude modulation (QAM), quadrature phase-shift keying (QPSK), phase-shift keying (PSK), orthogonal frequency-division multiplexing (OFDM), pulse-amplitude modulation (PAM), or the like. The PLCT modulates a digital carrier wave based on the received data, and the digital modulated carrier wave is converted to an analog signal and coupled to the power line via a coupler (such as the coupler 110).

The method 400 begins at step 402 and proceeds to step 404, where a determination is made whether there is a data packet available from the device for transmission. If the result of the determination is no, that no data packet is available, the method 400 returns to step 404. If the result of the determination is yes, that there is a data packet for transmission, the method 400 proceeds to step 406.

At step 406, generation of a gate control signal begins, such as the gate control signal comprising attack, transmit, and decay periods, for regulating the amplitude of the digital carrier waveform (before the start of the data packet and following the end of the data packet) as well as the modulated digital carrier waveform in a controlled manner as previously described. The method 400 proceeds to step 408 where the PLCT output waveform (i.e., the unmodulated carrier wave) is analyzed during the gate control signal attack period to determine the harmonic information (i.e., amplitude and phase) for one or more harmonics. Generally, the analog output waveform generated for output from the PLCT is converted to a digital signal and a Discrete Fourier Transform (DFT) (or, alternatively, a Fast Fourier Transform (FFT) or CORDIC algorithm) is performed as previously described to measure the amplitude and phase information of at least one harmonic; in other embodiments, a receiver can be tuned to a harmonic of interest and a simple CORDIC algorithm can be used to determine phase correction necessary. In one or more embodiments, the amplitude and phase information for the $2^{nd}$, $3^{rd}$, $4^{th}$, and $5^{th}$ order harmonics is determined; in other embodiments, the amplitude and phase information may be determined for fewer harmonics or additional and/or alternative harmonics. In certain embodiments, the harmonic information may be averaged.

In some alternative embodiments, a MAC layer of the PLCT transmitter enters a "maintenance cycle" (where all other modems are to be quiet) during which a constant amplitude single tone (or alternatively multiple tones) is transmitted and the resulting harmonic content is analyzed as described above to determine the harmonic information.

The method 400 proceeds to step 410 and the corresponding pre-distortion compensation (i.e., one or more compensation coefficients) is computed based on the determined harmonic information. At step 412, the computed compensation coefficients are applied to pre-distort the PLCT carrier waveform during the transmit period of the gate control signal (i.e., during the transmission of the packet preamble and payload) such that the determined harmonics are eliminated or substantially reduced to be below a threshold. In some embodiments, the modulated fundamental waveform and one or more modulated harmonic waveforms, generated at the determined harmonics, are each multiplied by the corresponding correction coefficients and then summed, e.g., as previously described with respect to the harmonic compensator 254. The compensation coefficients are thus used to adjust or filter the determined harmonics such that the net harmonic content power on the power line is significantly driven towards zero.

In some alternative embodiments, the computed compensation coefficients are used to update a sine look-up table used to generate a digital version of the carrier wave (e.g., sine table 206) as previously described. The resulting output from the sine look-up table is a pre-distorted waveform that, through repeated updates during iterations of the method 400, converges to a waveform where the determined harmonics are eliminated or substantially reduced to be below a threshold.

For example, carrier wave harmonics at frequencies greater than 500 kHz prior to pre-distortion may be reduced below a threshold level of 56 dB (µV). The compensation coefficients may then be stored and updated following additional computations of compensation coefficients.

The method 400 proceeds to step 414 where the PLCT output waveform is analyzed, for example as previously described, during the gate control signal attack period to determine the harmonic information (i.e., amplitude and phase) for one or more harmonics. At step 416, the compensation coefficients are computed based on the information determined at step 416. The computed compensation may then be used for pre-distorting the PLCT carrier waveform during subsequent data packet transmission. In some embodiments, the computed compensation may be averaged with previously computed compensation coefficients.

At step 418, a determination is made whether to continue. If the result of the determination is yes, the method 400 returns to step 404. If the result of the determination is no, the method 400 proceeds to step 420 where it ends.

Figure 5:
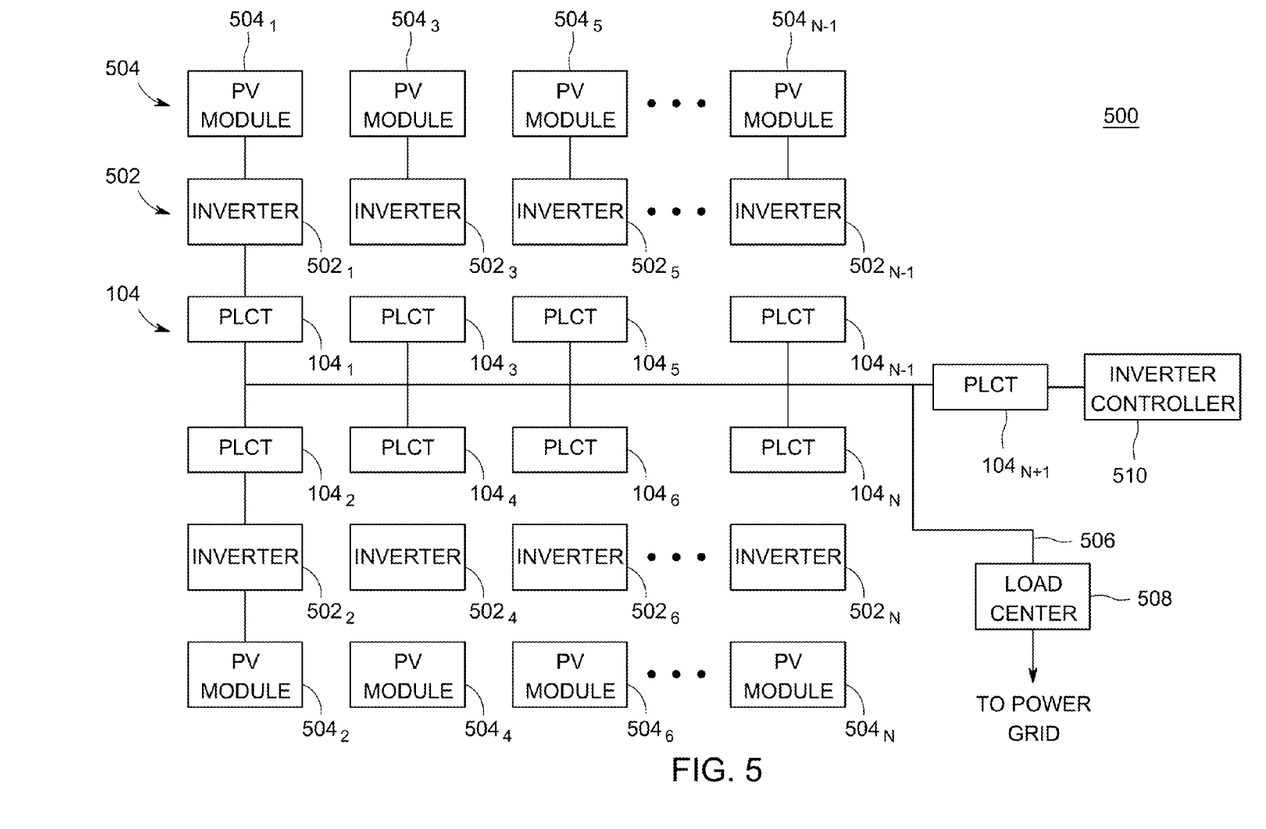
FIG. 5 is a block diagram of a system for inverting DC power to AC power using one or more embodiments of the present invention.

FIG. 5 is a block diagram of a system 500 for inverting DC power to AC power using one or more embodiments of the present invention. This diagram only portrays one variation of the myriad of possible system configurations and devices that may utilize the present invention. The present invention can be utilized by any device employing power line communication, and can function in a variety of distributed environments and systems requiring communications over power lines.

The system 500 comprises a plurality of inverters $502_1$, $502_2$ ... $502_n$, collectively referred to as inverters 502, a plurality of DC power sources 504-1, 504-2, 504-3 ... 504-N, collectively referred to as DC power sources 504, a plurality of PLCTs $104_1$, $104_2$ ... $104_n$, $104_{n+1}$, collectively referred to as PLCTs 104, AC power line 506, an inverter controller 510, and a load center 508. The DC power sources 504 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each inverter $502_1$, $502_2$ ... $502_n$ is coupled to a PLCT $104_1$, $104_2$ ... $104_n$, respectively; in some alternative embodiments, each of the PLCTs $104_1$, $104_2$ ... $104_n$ may be contained within the corresponding inverter $502_1$, $502_2$ ... $502_n$. Each inverter $502_1$, $502_2$ ... $502_n$ is additionally coupled to a DC power source $504_1$, $504_2$ ... $504_n$, respectively. The inverter controller 510 is coupled to the PLCT $104_{n+1}$ and is capable of communicating with the inverters 502 via the PLCTs 104 and/or via wireless communication for receiving data from the inverters 502 and providing operative control of the inverters 502. In some embodiments the inverter controller 510 may be a gateway for receiving information from and/or sending information to another device (such as a remote master controller), for example via the Internet. In such embodiments, the inverter controller 510 may communicate information from the inverters 502 (e.g., performance data) to a master controller, and/or communicate data from a master controller (e.g., control commands) to one or more of the inverters 502.

The AC power line 506 is further coupled to the load center 508 which houses connections between incoming commercial AC power lines from a commercial AC power grid distribution system and the AC power line 506. The inverters 502 convert DC power generated by the DC power sources 504 into AC power, and meter out AC current that meets the relevant requirements for being coupled to the commercial AC power grid voltage. The system 500 couples the generated AC power to the commercial AC power grid via the load center 508; additionally or alternatively, the generated power may be distributed for use, for example to one or more appliances, and/or the generated energy may be stored for later use, for example using batteries, heated water, hydro pumping, $H_2O$-to-hydrogen conversion, or the like.

Each inverter 502 can communicate with other devices (such as among one another, with the inverter controller 510, and/or other devices not shown) using power line communications over the AC power lines 506 via the PLCTs 104. In accordance with one or more embodiments of the present invention, the PLCTs 104 pre-distort the PLCT carrier waves in order to compensate for harmonic distortion generated within the PLCT, as described herein. As such, undesired harmonics in the PLCT output are eliminated or sufficiently reduced.

Figure 6:
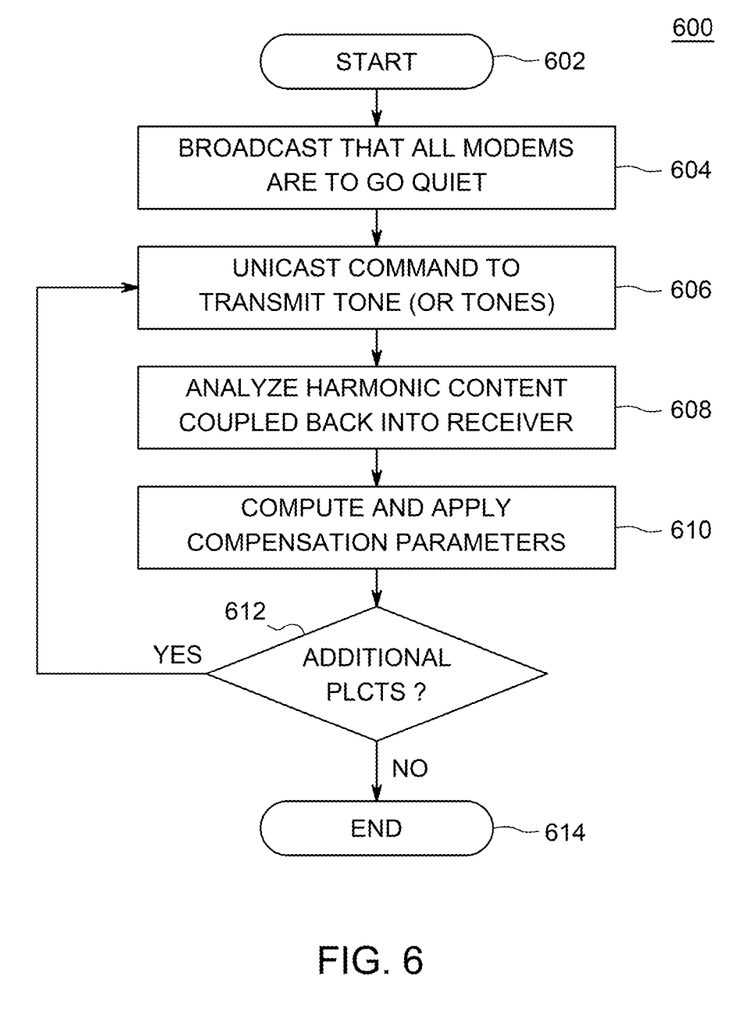
FIG. 6 is a flow diagram of a method for determining harmonic distortion compensation during a maintenance mode in accordance with one or more embodiments of the present invention.

FIG. 6 is a flow diagram of a method 600 for determining harmonic distortion compensation during a maintenance mode in accordance with one or more embodiments of the present invention. In general the method 600 is implemented within a system having a plurality of PLCTs in order to eliminate or substantially reduce one or more harmonics generated within each PLCT. In some embodiments, the method 600 is implemented in a power conversion system where the power converters communicate via the power lines using PLCTs (e.g., the system 500).

The method 600 begins at step 602 and proceeds to step 604. At step 604, a message is broadcast to all PLCTs to go quiet. The message may be broadcast from a system controller, such as the inverter controller 510 in the system 500, or from one of the PLCTs (i.e., from the PLCT controller) within the system. At step 606, a unicast command is sent to a PLCT within the system to transmit one or more tones.

The method 600 proceeds to step 608, where the one or more tones generated by the PLCT are analyzed as previously described to determine the harmonic information for one or more harmonics. In some embodiments, the tone or tones are coupled back within the PLCT (i.e., without being coupled to the power lines) as previously described. At step 610, harmonic compensation coefficients are computed based on the harmonic information and applied, as previously described.

The method 600 proceeds to step 612 where a determination is made whether there are additional PLCTs in the system for which the harmonic compensation is to be determined. If the result of the determination is yes, the method 600 returns to step 606 where a unicast command is sent to another PLCT in the system. If the result of the determination at step 612 is no, there are no additional PLCTs in the system, the method 600 proceeds to step 614 where it ends.

Figure 7:
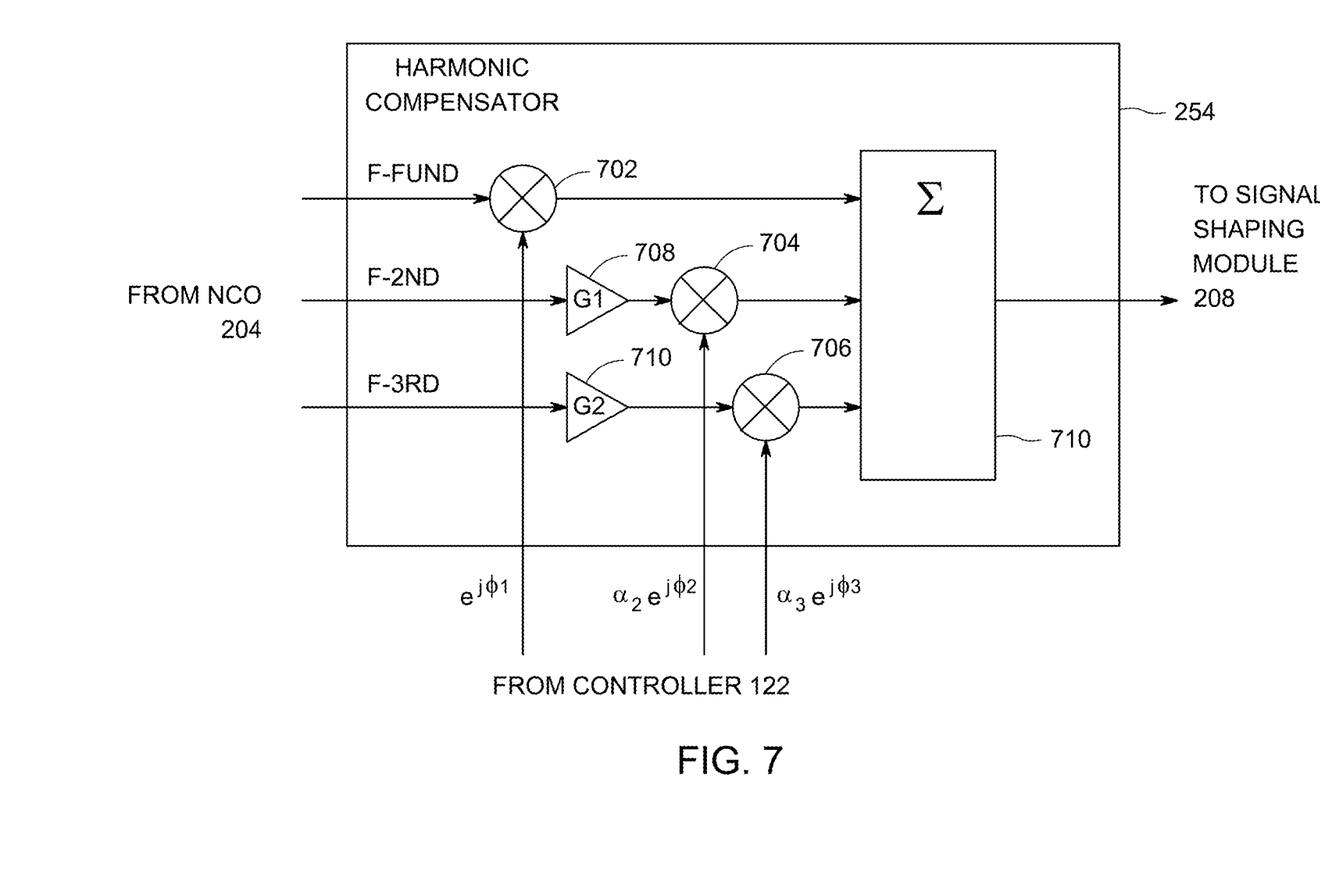
FIG. 7 is a block diagram of a harmonic compensator in accordance with one or more embodiments of the present invention.

FIG. 7 is a block diagram of a harmonic compensator 254 in accordance with one or more embodiments of the present invention. The harmonic compensator 254 comprises complex multipliers 702, 704 and 706; amplifiers 708 and 710; and summer 710. A first waveform from the NCO 204 is coupled to the complex multiplier 702. The first waveform, "F-fund", is the modulated digital carrier waveform at the fundamental frequency. A second waveform from the NCO 204 is coupled to the input of the amplifier 708, which has a gain of G1, and a third waveform from the NCO 204 is coupled to the input of the amplifier 710, which has a gain of G2. The second and third waveforms, "F-$2^{nd}$" and "F-$3^{rd}$" respectively, are the second and third harmonics, although in other embodiments different harmonics as well as fewer or more harmonics may be used.

The outputs from the amplifiers 708 and 710 are coupled to the multipliers 704 and 706, respectively. Each of the multipliers 702, 704 and 706 is coupled to the controller 122 for receiving the computed compensation $e^{j\Phi_1}$, $\alpha_2 e^{j\Phi_2}$, and $\alpha_3 e^{j\Phi_3}$, respectively, where "$\alpha$" is the amplitude compensation and "$\phi$" is the phase compensation. The outputs from the multipliers 702, 704 and 706 are coupled to the summer 710, which sums each of the received signals and couples the summed signals to the signal shaping module 208. The harmonic compensator 254 thus uses the compensation coefficients to adjust or filter the NCO-generated harmonics from the NCO 204 such that the adjusted harmonics, when summed with the unintentional harmonics (from analog front end imperfections, for example) reduces the net harmonic content power on the power line 120 significantly towards zero.

While the foregoing is directed to embodiments of the present invention, other and further embodiments of the invention may be devised without departing from the basic scope thereof, and the scope thereof is determined by the claims that follow.

The invention claimed is:

1. A method for distortion compensation in power line communications, comprising:
   analyzing a waveform generated by a transmitter of a power line communications transceiver (PLCT);
   determining a magnitude and phase for each harmonic of one or more harmonics of a carrier waveform of the PLCT;
   computing one or more harmonic compensation coefficients based on a corresponding magnitude and phase determined for each harmonic of the one or more harmonics; and
   pre-distorting, based on the one or more harmonic compensation coefficients, the carrier waveform such that the one or more harmonics are reduced below a threshold.

2. The method of claim 1, wherein the waveform analyzed is the carrier waveform, wherein the determining is performed based on analysis of the carrier waveform, and wherein the carrier waveform is unmodulated during the determining.

3. The method of claim 1, further comprising tuning a receiver to a particular harmonic of the carrier waveform to generate a harmonic waveform, wherein the determining is performed based on analysis of the harmonic waveform generated from the tuning.

4. The method of claim 1, wherein the waveform analyzed is a single tone generated by the transmitter during a maintenance mode of the PLCT, and wherein the determining is performed based on analysis of the single tone.

5. The method of claim 1, wherein pre-distorting the carrier waveform comprises:

multiplying a first waveform at the fundamental frequency of the carrier waveform by a first compensation coefficient to generate a corrected fundamental waveform, wherein the first compensation coefficient is based on the one or more harmonic compensation coefficients;
   multiplying each of one or more waveforms by a corresponding compensation coefficient based on the one or more harmonic compensation coefficients to generate one or more corrected harmonic waveforms, wherein each of the one or more waveforms has a frequency of one of the one or more harmonics; and
   summing the corrected fundamental waveform and the one or more corrected harmonic waveforms.

6. The method of claim 1, further comprising:
   generating a gate control signal having an attack period, a transmit period, and a decay period; and
   regulating the amplitude of the carrier waveform based on the gate control signal, wherein analyzing the waveform comprises analyzing the regulated carrier waveform generated during the attack period and the decay period.

7. The method of claim 6, further comprising modulating the carrier waveform based on data received by the PLCT, wherein the carrier waveform is multiplied by the value of the gate control signal during the attack period and during the decay period, and wherein the modulated carrier waveform is multiplied by the value of the gate control signal during the transmit period.

8. The method of claim 1, further comprising averaging at least one of the magnitude or phase determined for each harmonic of the one or more harmonics, wherein the averaging is used in computing the one or more harmonic compensation coefficients.

9. Apparatus for distortion compensation in power line communications, comprising:
   a power line communications transceiver (PLCT), comprising:
   a transmitter for generating a waveform; and
   a controller, having one or more processors and coupled to the transmitter, for (i) determining a magnitude and phase for each harmonic of one or more harmonics of a carrier waveform of the PLCT based on analysis of the waveform generated by the transmitter; and (ii) computing one or more harmonic compensation coefficients, based on a corresponding magnitude and phase determined for each harmonic of the one or more harmonics, for pre-distorting the carrier waveform such that the one or more harmonics are reduced below a threshold.

10. The apparatus of claim 9, wherein the controller is configured to analyze the carrier waveform and to determine magnitude and phase of at least one harmonic of the carrier waveform, and wherein the carrier waveform is unmodulated.

11. The apparatus of claim 9, wherein the PLCT further comprises a receiver tunable to a harmonic of the carrier waveform to generate a harmonic waveform, and wherein the controller performs the determining based on analysis of the harmonic waveform generated by tuning the receiver.

12. The apparatus of claim 9, wherein the controller performs the determining based on analysis of a single tone generated by the transmitter during a maintenance mode of the PLCT.

13. The apparatus of claim 9, wherein the PLCT further comprises a harmonic compensator that (a) multiplies a first waveform at the fundamental frequency of the carrier waveform by a first compensation coefficient to generate a corrected fundamental waveform, wherein the first compensation coefficient is based on the one or more harmonic compensation coefficients; (b) multiplies each of one or more waveforms by a corresponding compensation coefficient based on the one or more harmonic compensation coefficients to generate one or more corrected harmonic waveforms, wherein each of the one or more waveforms has a frequency of one of the one or more harmonics; and (c) sums the corrected fundamental waveform and the one or more corrected harmonic waveforms.

14. The apparatus of claim 9, further comprising a signal shaping module for regulating the amplitude of the carrier waveform based on a gate control signal having an attack period, a transmit period, and a decay period; wherein analyzing the waveform comprises analyzing the regulated carrier waveform generated during the attack period and the decay period.

15. The apparatus of claim 14, wherein the carrier waveform is modulated based on data received by the PLCT; and wherein the carrier waveform is multiplied by the value of the gate control signal during the attack period and during the decay period; and wherein the modulated carrier waveform is multiplied by the value of the gate control signal during the transmit period.

16. The apparatus of claim 9, wherein the controller is configured to average determined magnitude and phase information and to compute, based on averaged information, the one or more harmonic compensation coefficients.

17. A system for harmonic distortion compensation in power line communications, comprising:
 a plurality of DC-AC inverters coupled to an AC power line; and
 a plurality of power line communications transceivers (PLCT) coupled to the plurality of DC-AC inverters in a one-to-one correspondence, wherein each PLCT comprises:
  a transmitter for generating a waveform; and
  a controller, having one or more processors and coupled to the transmitter, for (i) determining a magnitude and phase for each harmonic of one or more harmonics of a carrier waveform of the PLCT based on analysis of the waveform generated by the transmitter; and (ii) computing one or more harmonic compensation coefficients, based on a corresponding magnitude and phase determined for each harmonic of the one or more harmonics, for pre-distorting the carrier waveform such that the one or more harmonics are reduced below a threshold.

18. The system of claim 17, wherein each PLCT further comprises a harmonic compensator that (a) multiplies a first waveform at the fundamental frequency of the carrier waveform by a first compensation coefficient to generate a corrected fundamental waveform, wherein the first compensation coefficient is based on the one or more harmonic compensation coefficients; (b) multiplies each of one or more waveforms by a corresponding compensation coefficient based on the one or more harmonic compensation coefficients to generate one or more corrected harmonic waveforms, wherein each of the one or more waveforms has a frequency of one of the one or more harmonics; and (c) sums the corrected fundamental waveform and the one or more corrected harmonic waveforms.

19. The system of claim 17, further comprising an inverter controller and an inverter controller PLCT coupled to the inverter controller, wherein the inverter controller (a) is communicatively coupled to the plurality of DC-AC inverters via the AC power line, (b) receives performance data from the DC-AC inverters via power line communications, and (c) transmits the performance data to a remote device.

20. The system of claim 19, wherein the inverter controller transmits the performance data to the remote device via the Internet.

* * * * *